United States Patent
Do

(10) Patent No.: US 9,651,025 B2
(45) Date of Patent: May 16, 2017

(54) TORNADO FAN

(76) Inventor: Ted Xuan Do, Bronx, NY (US)

(*) Notice: Subject to any disclaimer, the term of this patent is extended or adjusted under 35 U.S.C. 154(b) by 731 days.

(21) Appl. No.: 12/395,642

(22) Filed: Feb. 28, 2009

(65) Prior Publication Data

US 2010/0221114 A1   Sep. 2, 2010

(51) Int. Cl.
*F01D 5/18* (2006.01)
*F03D 3/06* (2006.01)

(52) U.S. Cl.
CPC .................. *F03D 3/061* (2013.01)

(58) Field of Classification Search
USPC ...... 416/63, 100, 108, 110, 116, 170 R, 205, 416/244 R, 246, 247 R
See application file for complete search history.

(56) References Cited

U.S. PATENT DOCUMENTS

| | | | | |
|---|---|---|---|---|
| 2,451,970 A | * | 10/1948 | Odor | 248/603 |
| 2,618,434 A | * | 11/1952 | Farnsworth | 416/100 |
| 3,173,478 A | * | 3/1965 | Maycen | 165/121 |
| D312,124 S | * | 11/1990 | Coup et al. | D23/382 |
| D314,047 S | * | 1/1991 | Wang | D23/378 |
| D315,018 S | * | 2/1991 | Wang | D23/382 |
| 5,368,445 A | * | 11/1994 | Litvin et al. | 416/246 |
| 5,720,594 A | * | 2/1998 | Snow | 416/100 |
| RE36,514 E | * | 1/2000 | Clark | 416/110 |
| 2002/0034442 A1 | * | 3/2002 | Escobar et al. | 416/205 |
| 2004/0120822 A1 | * | 6/2004 | Shapiro et al. | 416/205 |
| 2007/0243064 A1 | * | 10/2007 | Nakano et al. | 416/63 |
| 2010/0003149 A1 | * | 1/2010 | Nelson | 417/423.9 |

* cited by examiner

*Primary Examiner* — Michael Lebentritt
(74) *Attorney, Agent, or Firm* — Wilson Daniel Swayze, Jr.

(57) ABSTRACT

A tornado fan for cooling a room may include a stand member to support the tornado fan, a motor member to connect to the stand member and to rotate a fan blade of the tornado fan, and a cage member to enclose the motor member and fan blade. The fan blade may be substantially planar and includes a semi circle cross-section, and the stand member may include a platform to connect to the motor member. The motor member may include a platform to connect to the platform of the stand member, and the cage member may include a platform to connect to the platform of the motor member and the platform of the stand member. The motor member may include a stopper platform to connect to the fan blade, and the motor member may include a traverse pin to cooperate with the stopper platform.

10 Claims, 4 Drawing Sheets

TORNADO FAN

FIELD OF THE INVENTION

This invention relates generally to cooling or heating of air circulating within a chamber such as a room. More specifically, it concerns provision of compact, efficient apparatus to transfer heat to or from air being circulated in the room, and in association with effecting of such circulation.

BACKGROUND

Typically, electric fans, such as of the portable or ceiling fan variety, have been employed to circulate air in an environment through the movement or rotation of the fan blades by an electrical motor so as to permit the movement of the air by the rotation of the angle fan blades of the fan. The prior art, of course, is replete with pneumatic devices which serve to establish currents of air for various purposes. Among such devices are those employed for purposes of enhancing the comfort of occupants of an enclosure, such as the room of a dwelling or similar enclosure. These devices frequently are referred to as fans and include impellers which serve to establish cooling currents of air as rotation is imparted thereto. In some instances, a fan is designed to operate in close proximity with a floor in order to cause streams of air found in cooler zones, just above the level of the floor, to move upwardly into the air of warmer zones for cooling purposes. A fan of this type which has experienced generally widespread acceptance often is referred to as a Hassick fan. Such a fan frequently is adapted to be seated on the floor and is provided with impeller blades which serve to impart vertical momentum to a body of air, whereby an upwardly directed air current is established as rotary motion is imparted to the blades. Of course, as can be appreciated by those who are familiar with such fans, the efficiency often is less than desired, simply because the currents thus established lack sufficient horizontal momentum and velocity to perform a suitable cooling function.

Another type of fan sometimes employed for purposes of circulating air within a room includes an impeller having blades supported for rotation about a horizontally extended axis for purposes of establishing a horizontally directed stream of air. Such fans, also, have acquired general acceptance. However, as can be appreciated by those familiar with these devices, the air streams established through an operation thereof tend to be highly directional. Unfortunately, such devices are, in many instances, found to be impractical due to their innate directional characteristics and the attendant turbulence created through an operation thereof.

Centrifugal fans also are well known. These fans are characterized by impellers having arrays of elongated blades supported in substantial parallelism. Frequently, the impellers of centrifugal fans are employed in the substantially closed housing for accelerating streams of air through a conduit, while the conduit and housing serve to convert the velocity of the air to pressure. Such impellers, generally, are not employed without an housing and tend to lack a capability for establishing suitable air currents in open spaces such as are needed in the cooling of rooms of a dwelling.

Since fans adapted to circulate room air for cooling occupants generally have experienced widespread acceptance, and the use thereof is highly desirable, particularly in those instances where refrigerated air is not available, attempts to increase the overall efficiency of such devices is sought continuously.

SUMMARY

A tornado fan for cooling a room may include a stand member to support the tornado fan, a motor member to connect to the stand member and to rotate a fan blade of the tornado fan, and a cage member to enclose the motor member and fan blade.

The fan blade may be substantially planar and includes a semi circle cross-section, and the stand member may include a platform to connect to the motor member.

The motor member may include a platform to connect to the platform of the stand member, and the cage member may include a platform to connect to the platform of the motor member and the platform of the stand member.

The motor member may include a stopper platform to connect to the fan blade, and the motor member may include a traverse pin to cooperate with the stopper platform.

The fan blade may include a narrow portion to cooperate with the stopper platform, and the cage member may include a top semi-hemispherical grid.

The cage member may include a bottom semi-hemispherical grid, and the motor member may include a shaft member to rotate the fan blade and to cooperate with a nut member to retain the fan blade.

DETAILED DESCRIPTION OF THE DRAWINGS

The invention may be understood by reference to the following description taken in conjunction with the accompanying drawings, in which, like reference numerals identify like elements, and in which.

DETAILED DESCRIPTION

Figure 1:
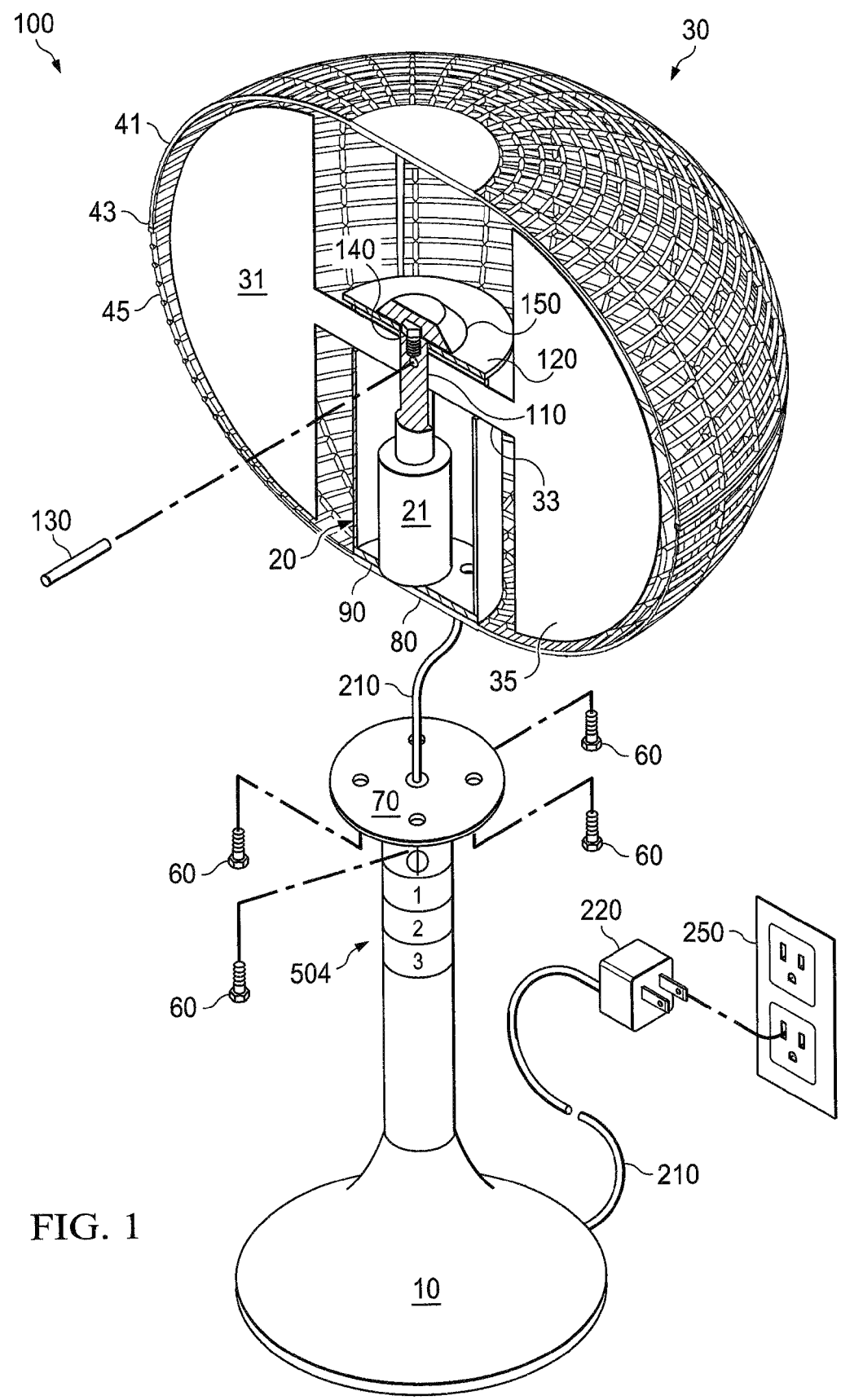
FIG. 1 illustrates a cross-sectional view of the tornado fan of the present invention.

It is therefore a general purpose of the instant invention to provide a fan having an improved impeller having an enhanced capability for circulating room air with greater efficiency.

The tornado fan 100 of the present invention may include a stand member 10 to support the tornado fan 100, a motor member 20 which may be positioned on the stand member 10 to rotate impellers or fan blades 31, a fan member 30 which may include the fan blades 31 and a cage member 40 to provide a protective screen for the fan blades 31 to avoid the fan blades 31 from being unintentionally touched while rotating.

The stand member 10 of the tornado fan 100 may include a switch 504 turning the tornado fan 100 on and off may include additional switch positions in order to control the speed of the motor member 20, for example the speed may include low, medium and high. The stand member 10 may include a platform 70 which may be a metal plate having apertures and connected to the stand member 10 and which may cooperate with a platform 80 of the cage member 40 which may be a metal plate having apertures which may cooperate with the apertures of the platform 70.

The motor member 20 may include an electric motor 21 which may be connected to electric wire 210 which may be connected to a electrical plug 220 which may be connected to electrical socket 250 in order to supply electric power from the household power supply to the electric motor 21. The motor member 20 may include a platform 90 including apertures which may cooperate with the platform 70 of the stand member 10 and the platform 80 of the cage member 40 to connect the motor member 20 the stand member 10 and a cage member 40 together. The apertures of the platform 90 may be aligned with the apertures of the platform 80 and the platform 70 so that a fastening device 60 which may be screws, nuts, pins or other type devices may be used to connect the motor member 20, the cage member 40 and the stand member 10 together. The platform 90 may be positioned on the bottom of the motor member 20. A motor shaft 110 may extend from the motor member 20 and may be connected to the motor 21 and may rotate in accordance with the motor and in accordance with the position of the switch 50 which may determine the speed that the motor shaft 110 rotates. The motor member 20 may include a traverse pin 130 which may extend substantially perpendicular to the motor shaft 110. The motor shaft 110 may include a threaded portion to cooperate with a cover member 150 which may include a locknut cover which may include a nut member 140 which may include a threaded portion to cooperate with the threaded portion of the motor shaft 110. The cover member 150 cooperates with a narrow portion of the fan blades 31 to allow the fan blades 31 to rotate with respect to the motor shaft 110.

The motor member 20 may include a stopper platform 120 which may be a stopper plate and may be connected to the motor shaft 110 and positioned approximately 90° with respect to the motor shaft 110. The stopper platform 120 may rotate with the motor shaft 110 and cooperates with the narrow portion 240 of the fan blade 31 so that the stopper platform 120 rotates the fan blade 31. The fan blade 31 may be substantially planar and may include a semi-circular cross-section.

FIG. 1 additionally illustrates that the cage member 40 may include a top substantially semi-hemispherical grid 41 which may include intersecting rods to prevent users from being injured by the fan blades 31 and may include a bottom substantially semi-hemispherical grid 43 which may include intersecting rods to prevent the user from injury from the fan blades 31. The top substantially semi-hemispherical grid 41 may cooperate with the bottom substantially semi-hemispherical grid 43 to enclose the fan blades 31. FIG. 1 additionally illustrates the fan blade 31 which includes a semi circle portion 35 and a narrow portion 33 to connect to the stopper platform 120 so that the fan blade 31 can be driven by the motor member 20. The semi circle portion 31 may be in the shape of a semi circle in order to provide vigorous airflow throughout the entire room. Other shapes such as a semi oval are within the scope of the invention.

Figure 2:
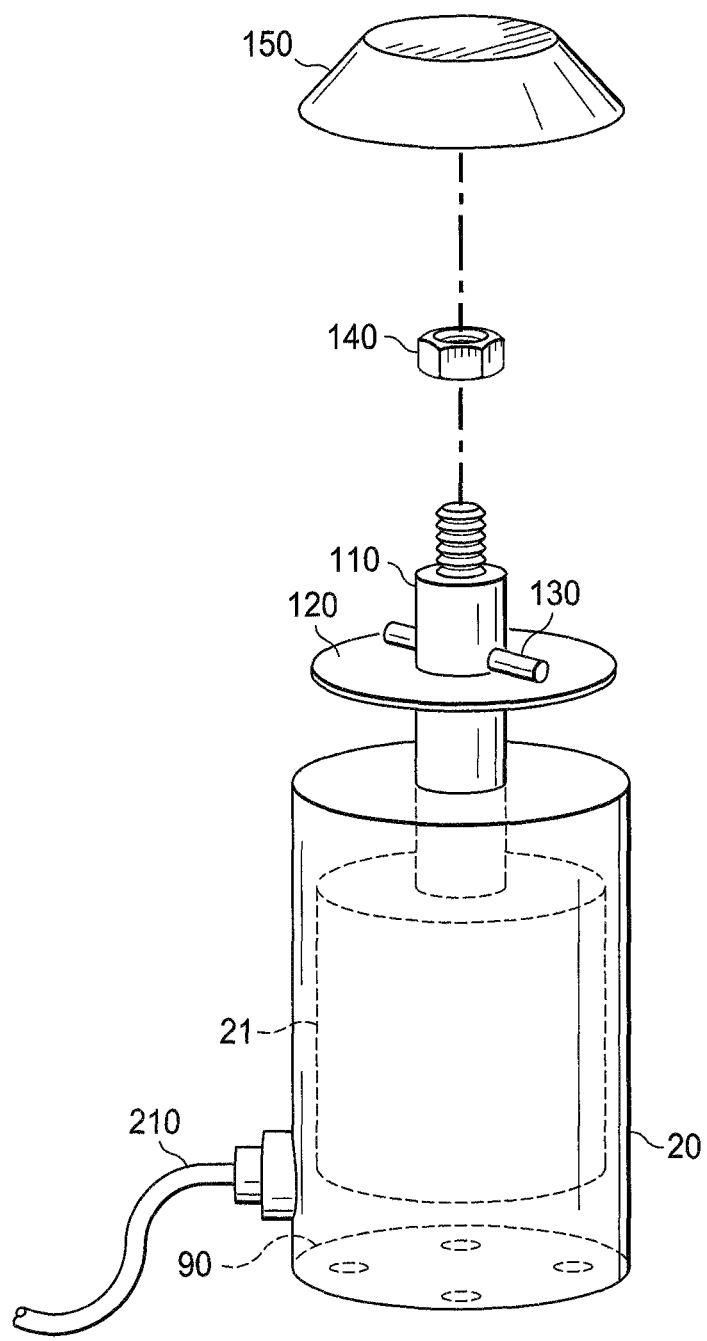
FIG. 2 illustrates a partial exploded view of the motor member of the tornado fan.

FIG. 2 illustrates that the motor member 20 may include an electric motor 21 which may be connected to electric wire 210 in order to supply electric power from the household power supply to the electric motor 21. The motor member 20 may include a platform 90 which may be located on the bottom of the motor member 20 and may include apertures which may cooperate with the platform 70 of the stand member 10 and the platform 80 of the cage member 40 to connect the motor member 20, the stand member 10 and a cage member 40 together. A motor shaft 110 may extend from the motor member 20 and may be connected to the motor 21 and may rotate in accordance with the motor and in accordance with the position of the switch 50 (as shown in FIG. 1) which may determine the speed that the motor shaft 110 rotates. The motor member 20 may include a traverse pin 130 which may extend substantially perpendicular to the motor shaft 110. The motor shaft 110 may include a threaded portion at one end of the motor shaft 110 to cooperate with a cover member 150 which may include a locknut cover which may include a nut member 140 which may include a threaded portion to cooperate with the threaded portion of the motor shaft 110. The cover member 150 cooperates with a narrow portion 33 of the fan blades 31 to allow the fan blades 31 to rotate with respect to the motor shaft 110 as shown in FIG. 1.

The motor member 20 may include a stopper platform 120 which may be a stopper plate and may be connected to the motor shaft 110 and positioned approximately 90° with respect to the motor shaft 110. The stopper platform 120 may rotate with the motor shaft 110 and cooperates with the narrow portion 33 of the fan blade 31 so that the stopper platform 120 rotates the fan blade 31. The fan blade 31 may be substantially planar and may include a semi-circular cross-section.

Figure 3:
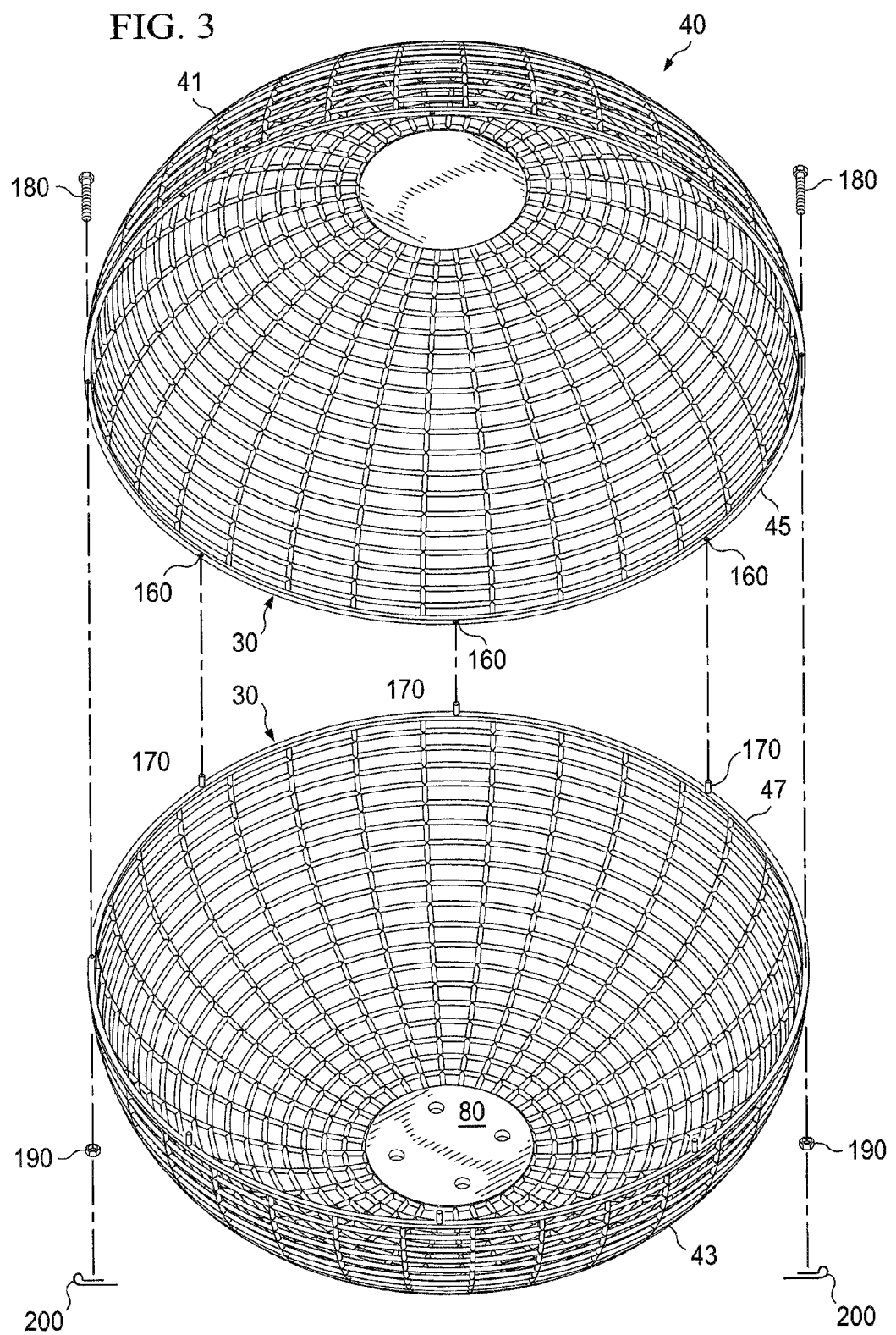
FIG. 3 illustrates a perspective view of the cage member of the tornado fan.

FIG. 3 additionally illustrates that the cage member 40 may include a top substantially semi-hemispherical grid 41 which may include intersecting rods to prevent users from being injured by the fan blades 31 and may include a bottom substantially semi-hemispherical grid 43 which may include intersecting rods to prevent the user from injury from the fan blades 31. The top substantially semi-hemispherical grid 41 may cooperate with the bottom substantially semi-hemispherical grid 43 to enclose the fan blades 31.

FIG. 3 illustrates that the top and bottom semi-hemispherical grid 41, 43 includes a top peripheral rim 45 and a bottom peripheral rim 47 which extends around the periphery of the top and bottom semi-hemispherical grid 41, 43. The top peripheral rim 45 may include guide apertures 160, and the bottom peripheral rim 47 may include guide member 170 to cooperate with the guide apertures 163 and may be upward extending rods to maintain the top and bottom semi-hemispherical grid 41, 43 in position. Additionally, bolts 180, nuts 190 and a cotter pin 200 may be used to retain the top semi-hemispherical grid 411 with the bottom semi-hemispherical grid 43.

Figure 4:
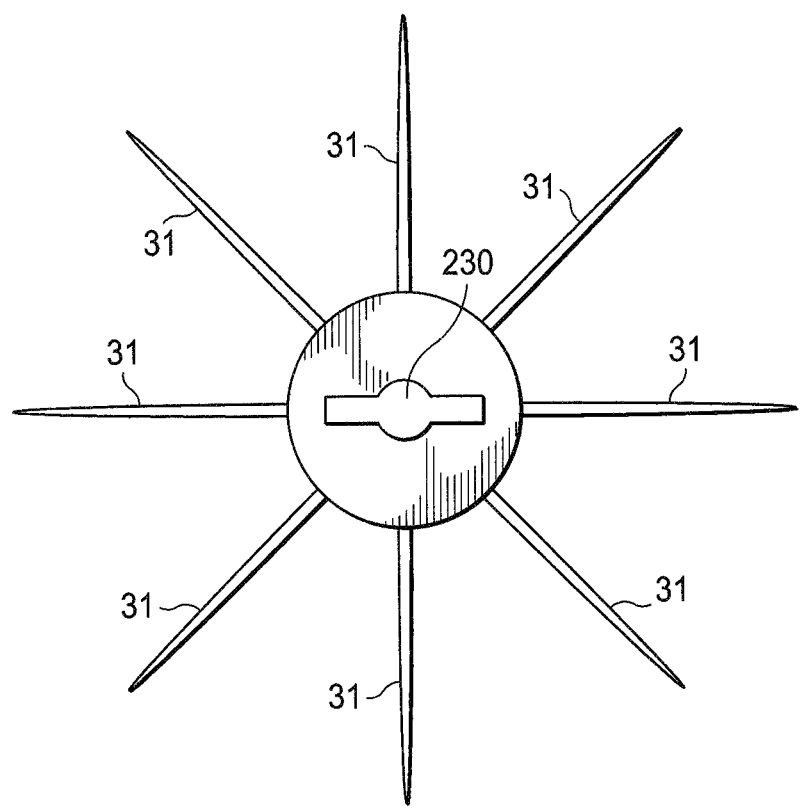
FIG. 4 illustrates the arrangement of fan blades of the tornado fan.
Figure 5:
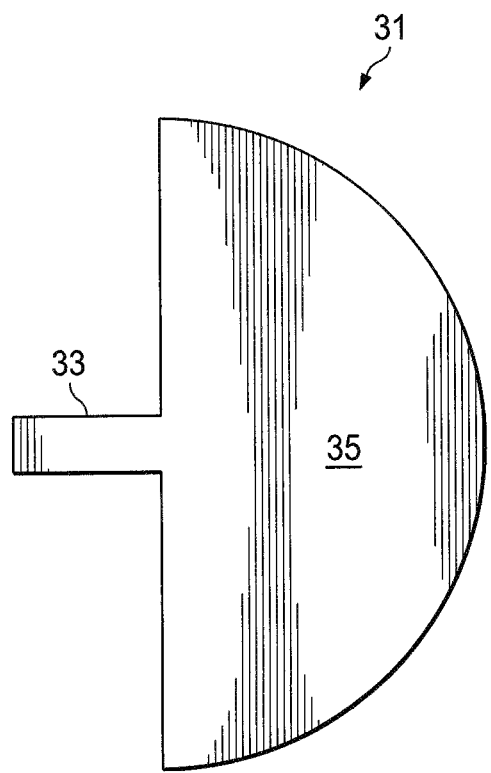
FIG. 5 illustrates a cross-sectional view of a fan blade of the tornado fan.

FIG. 4 illustrates the arrangement of fan blades 31 of the tornado fan;

FIG. 5 illustrates a cross-sectional view of a fan blade 31 of the tornado fan.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A tornado fan for cooling a room, comprising:
   a stand member to support the tornado fan;
   a motor member to connect to the stand member and to rotate a fan blade of the tornado fan;
   a cage member to enclose the motor member and fan blade;
   wherein the fan blade is substantially planar and includes a semi circle cross-section.

2. A tornado fan for cooling a room as in claim 1, wherein the stand member includes a platform to connect to the motor member.

3. A tornado fan for cooling a room as in claim 2, wherein the motor member includes a platform to connect to the platform of the stand member.

4. A tornado fan for cooling a room as in claim 3, wherein the cage member includes a platform to connect to the platform of the motor member and the platform of the stand member.

5. A tornado fan for cooling a room as in claim 1, wherein the motor member includes a stopper platform to connect to the fan blade.

6. A tornado fan for cooling a room as in claim 5, wherein the motor member includes a traverse pin to cooperate with the stopper platform.

7. A tornado fan for cooling a room as in claim 6, wherein the fan blade includes a narrow portion to cooperate with the stopper platform.

8. A tornado fan for cooling a room as in claim 1, wherein the cage member includes a top semi-hemispherical grid.

9. A tornado fan for cooling a room as in claim 1, wherein the cage member includes a bottom semi-hemispherical grid.

10. A tornado fan for cooling a room as in claim 1, wherein the motor member includes a shaft member to rotate the fan blade and to cooperate with a nut member to retain the fan blade.

* * * * *